Patented June 14, 1932

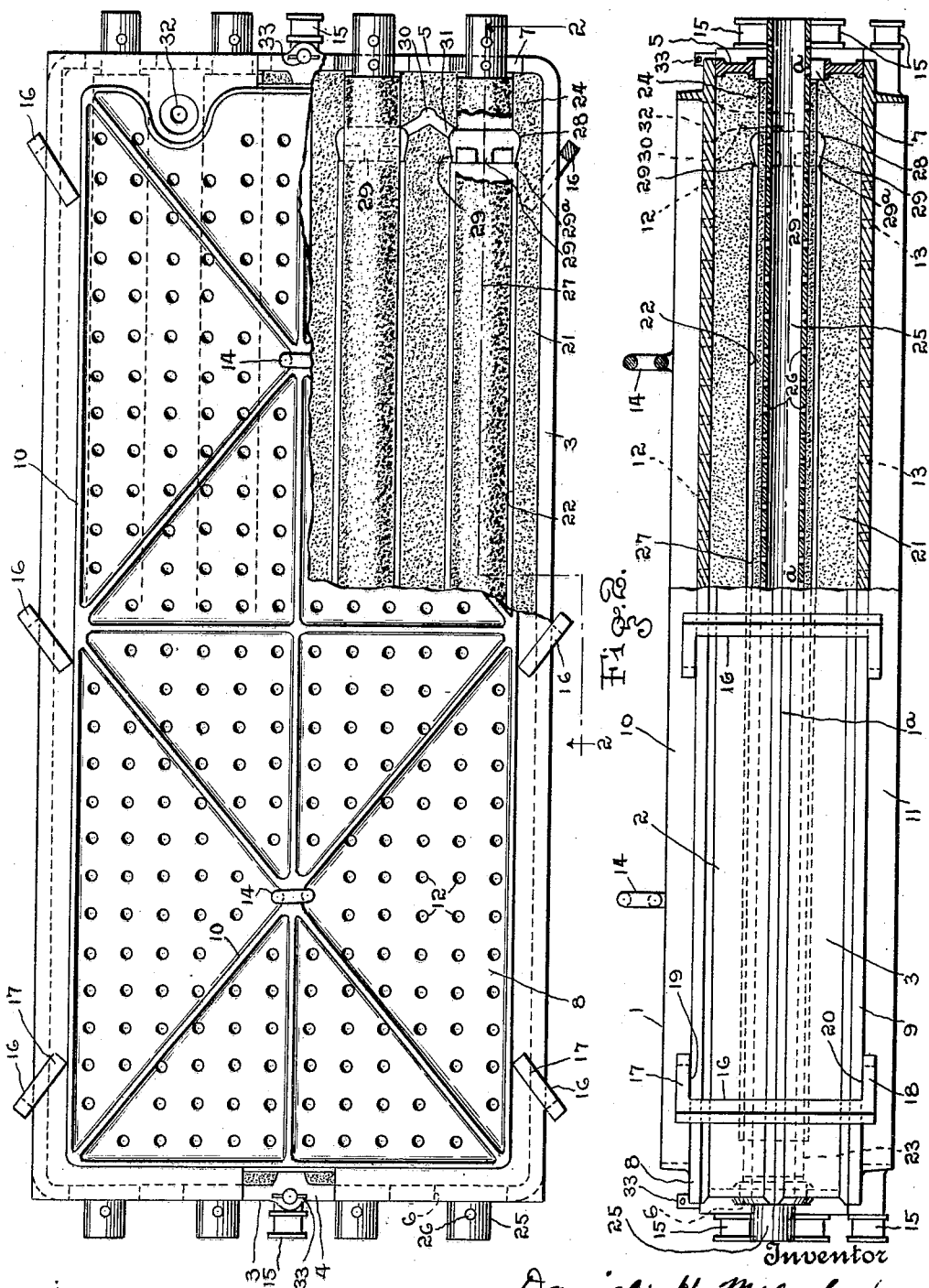

1,862,975

UNITED STATES PATENT OFFICE

DANIEL H. MELOCHE, OF NEW YORK, N. Y., ASSIGNOR TO AMERICAN RADIATOR COMPANY, OF NEW YORK, N. Y., A CORPORATION OF NEW JERSEY

PIPE CASTING APPARATUS

Application filed October 30, 1930. Serial No. 492,111.

My invention relates to new and useful improvements in an apparatus for casting pipe, and more particularly to a flask mold.

An object of my invention is to provide a mold which will produce pipe which is true to dimension.

Another object is to provide a mold which will produce pipe free from swells, shrinkage pores and occluded dirt.

The invention consists in the improved construction and combination of parts, to be more fully described hereinafter, and the novelty of which will be particularly pointed out and distinctly claimed.

In the accompanying drawing, to be taken as a part of this specification, I have fully and clearly illustrated a preferred embodiment of my invention, in which drawing—

Figure 1 is a top plan view of a flask mold of my invention, having a portion of the top plate and flask cope broken away to shown the internal assembly, and Fig. 2 is a view in elevation and partially in vertical section on the line 2—2 of Fig. 1.

Referring to the drawing by characters of reference, 1 designates a flask body which is preferably substantially rectangular, and comprises cope and drag sections 2, 3, respectively, in which counterparts of the mold are formed, said sections when assembled meeting on the line 1ª. Through the opposite end walls 4, 5 of the body 1 are alined apertures or openings 6, 7, preferably circular, and having their center points located in the parting line between the sections, said apertures being formed by semi-circular recesses formed in the meeting edges of the end walls of the cope and drag sections. The body 1 is provided with top and bottom plates or boards 8, 9, respectively, having reinforcing flanges 10, 11 and vent holes 12, 13, respectively. The top plate preferably has lifting eyes 14, whereas the bottom plate and the cope and drag sections each are provided with end trunnions 15 by which they may be lifted.

The sections 2, 3 are clamped tightly together, and the top and bottom plates 8, 9 are clamped tightly thereto by clamping members 16 positioned in spaced relation along the sides of the body 1. Each of the members 16 may be in the form of a C-shaped bar having lateral, alined arms 17, 18 at its ends, the plate engaging faces 19, 20 of the arms preferably being inclined to provide a wedging action to draw the sections and plates tightly together, or wedges (not shown) may be driven between the arms and the plates.

The body 1 contains a mold formed from suitable molding material 21, such as green molding sand, and includes a substantially cylindrical mold cavity 22 extending lengthwise of the mold and symmetrical about the parting line between the mold sections and formed by cooperating matching semi-cylindrical prints in said sections. At the ends of the cavity 22 the material 21 is formed to provide core engaging and supporting portions 23, 24, respectively, preferably defining substantially cylindrical apertures concentric with and of less diameter than the mold cavity, these apertures being formed by matching semi-circular recesses in the material of the cope and drag mold sections. Extending through the cavity 22 and longitudinally coaxial therewith, is a hollow core arbor 25 having vent apertures 26 and projecting freely through the end wall apertures 6, 7 in spaced relation to the walls 4, 5. Carried by and formed on the arbor 25 is a sand core member 27, preferably cylindrical, which is seated and held tightly adjacent its ends in the apertures defined by portions 23, 24 which conform to the ends of the core member and cooperate with the core to seal the ends of the mold cavity. The core member 27 is spaced from the end walls 4, 5, preferably terminating short of the same, but the apertures 6, 7 are preferably of a diameter greater than that of the core member ends so that the ends of the core member 27 may extend freely through the apertures 6, 7 in spaced relation to the end walls 4, 5. Intermediate the portion 24 and the adjacent end of the mold cavity 22, is a runner 28 formed in the material 21 and which surrounds the core member 27. Extending from the runner 28 are branches or flow passages 29 which open longitudinally into the end of cavity 22 at a plurality of points, shown as four in number, spaced equidistant about the circumference of the cavity. It will be understood that half of the annular runner is formed in each of the cope and drag molds respectively. The inner ends of the passages 29 at which they deliver into the cavity 22 are tapered to form with the end of the cavity an inward projection 29ª in order to provide on the casting a break-shoulder or line to facilitate removal of the sprue formed by the runner when the casting is removed from the mold. This shoulder 29ª accurately defines the length of the pipe to be formed by the cavity 22. A pouring gate 30 is formed in the material 21 of the cope mold and opens laterally into the runner through a duct 31 substantially on the parting line of the sections 2, 3, and formed, preferably, by cooperating prints in the mold sections. In the top plate 8 is a pouring hole 32 which registers with the gate 30. The cope and drag sections 2, 3 are preferably held against lateral movement relative to each other by pins 33 extending through registering apertures in the end walls of the sections. When the invention is embodied in a mold for casting in multiple, as shown, the gate 30 is preferably positioned intermediate two mold cavities and feeds two runners simultaneously.

In order to make the mold, the cope and drag prints thereof are made in each of the flask sections and by applying the same to a suitable pattern, and then packing the sand therein to form complementary mold prints, such that when the cope and drag sections are assembled the prints will match to form the complete mold structure above described, the matching line of the mold being indicated by the dot and dash line a—a in Fig. 2. Before assembling the cope and drag sections, the cores 27 are set in the cavities 22 of the mold in the drag section, with the ends of the cores seated in the semi-circular recesses which form the lower half of the apertures 23, 24, and so that the ends of the core bars project outwardly of the flask, as shown in Fig. 1. The cope section is then applied to the drag section and centered thereon by the pins 33, so that the prints in the flask sections register to complete the mold cavity 22 and the runner 28, whereupon the top plate is applied and clamped to the bottom plate, whereby the cope and drag molds and said plates are securely clamped together, with the core member tightly held at its ends and concentrically positioned in the cavity 22 by the mold portions 23, 24. It will be understood that the gate 30 is formed in the cope section before the mold parts are assembled. When the flask sections have been clamped together the mold is ready for pouring, which is preferably performed with the mold tilted so that the gate end will be uppermost, thus facilitating rapid pouring and also proper venting of the gases through the hollow core bars or arbors. By locating and holding the ends of the sand core member in apertures concentric with the mold cavity and which are formed in the molding sand, the core member will be positioned and held accurately in the mold cavity independently of the core arbor and the flask.

By making the openings 6 and 7 in the ends of the flask sections of greater diameter than the ends of the core arbor, the latter is not held rigidly at any point, and free longitudinal expansion thereof, due to heating, may take place, thereby obviating buckling or warping of the arbor and assuring correct alinement and spacing of the core in the mold cavity 22. While the ends of the sand core are clamped rigidly in the apertures 23 and 24 against lateral displacement, the sand contact between the core and the walls of said apertures will permit sufficient free expansion of the arbor to prevent warping or buckling of the arbor and the core when the hot metal is poured into the mold and during cooling, thus obviating misalinement of the core and assuring production of pipe which will be true to dimension and of uniform metal line or thickness of wall. Pouring of the pipe through an end gate results in a product free from shrinkage pores and occluded dirt intermediate its ends, and which has a substantially uninterrupted external surface, eliminating side sprues which must be ground off and resulting from side gates.

What I claim and desire to secure by Letters Patent of the United States is:—

1. An apparatus for casting pipe, comprising a flask body having alined apertures through its opposite end walls, a core arbor extending freely through said apertures in spaced relation to said walls, said arbor having a core member formed thereon and spaced from said walls, mold forming material in said body having portions conforming to and supporting said core member adjacent its ends, said mold forming material being the sole supporting means for said arbor and core member, and a mold cavity formed in said material between said supporting portions and surrounding said core member.

2. An apparatus for casting pipe, comprising a flask body having top and bottom plates and having alined apertures through its opposite end walls, means clamping said plates to said body, a core arbor extending freely through said apertures in spaced relation to said walls, said arbor having a core member formed thereon and spaced from said walls, mold forming material in said body having portions conforming to and supporting said core member adjacent its ends, said mold forming material being the sole supporting means for said arbor and core member, and a mold cavity formed in said material between said supporting portions and surrounding said core member.

3. An apparatus for casting pipe, comprising a flask body having alined apertures through its opposite end walls, a core arbor extending freely through said apertures in spaced relation to said walls, said arbor having a core member formed thereon and spaced from said walls, mold forming material in said body having portions conforming to and supporting said core member adjacent its ends, a mold cavity formed in said material between said supporting portions and surrounding said core member, and gate and runner means at one end of said cavity and intermediate said cavity and one of said portions.

4. An apparatus for casting pipe, comprising a flask body having alined apertures through its opposite end walls, a core arbor extending freely through said apertures in spaced relation to said walls, said arbor having a core member formed thereon and spaced from said walls, mold forming material in said body having portions conforming to and supporting said core member adjacent its ends, a mold cavity formed in said material between said supporting portions and surrounding said core member, a runner surrounding said core at one end of said cavity, and gate means for said runner.

5. An apparatus for casting pipe, comprising a flask body having alined apertures through its opposite end walls, a core arbor extending freely through said apertures in spaced relation to said walls, said arbor having a core member formed thereon and spaced from said walls, mold forming material in said body having portions conforming to and supporting said core member adjacent its ends, a mold cavity formed in said material between said supporting portions and surrounding said core member, a runner surrounding said core and having a plurality of branches opening longitudinally into one end of said cavity, and gate means opening laterally into said runner.

6. An apparatus for casting pipe, comprising a flask body having cope and drag sections and having through its opposite end walls alined apertures centered in the parting line of said sections, a core arbor extending freely through said apertures in spaced relation to said walls, a substantially cylindrical core member on said arbor and spaced from said walls, said sections containing mold forming material having portions of said material adjacent the ends of said member conforming to and supporting said member, said material being the sole supporting means for said member, said material having a substantially cylindrical mold cavity concentrically surrounding said member between said supporting portions, and means tightly clamping said portions upon said member to rigidly support said member and to seal said cavity.

In testimony whereof I have hereunto subscribed my name this 28th day of October, 1930.

DANIEL H. MELOCHE.